Dec. 28, 1965 W. E. ANDERSON 3,225,986
BUMPER CARRIER FOR A TWO-WHEELED VEHICLE
Filed Aug. 18, 1964 2 Sheets-Sheet 1
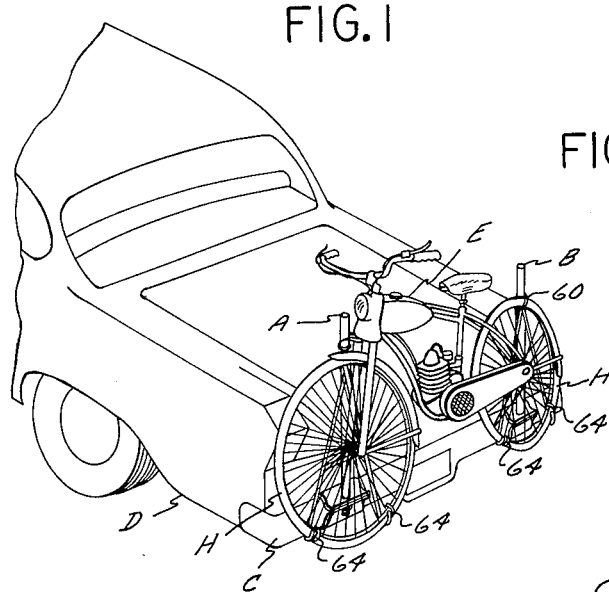
FIG. 1
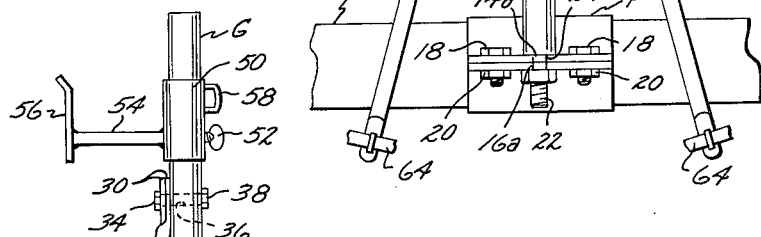
FIG. 2
FIG. 3
FIG. 4
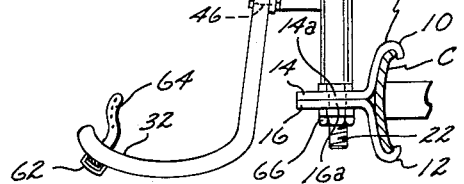
INVENTOR.
WAYNE E. ANDERSON Dec. 28, 1965  W. E. ANDERSON  3,225,986
BUMPER CARRIER FOR A TWO-WHEELED VEHICLE
Filed Aug. 18, 1964  2 Sheets-Sheet 2

INVENTOR.
WAYNE E. ANDERSON
BY
ATTORNEY

United States Patent Office 3,225,986
Patented Dec. 28, 1965

3,225,986
BUMPER CARRIER FOR A TWO-WHEELED VEHICLE
Wayne E. Anderson, 14514 Benfield Ave., Norwalk, Calif.
Filed Aug. 18, 1964, Ser. No. 390,439
10 Claims. (Cl. 224—42.03)

The present invention relates generally to carriers, and more particularly to a carrier for motorbikes, and other two-wheeled vehicles that may be removably supported from the bumper of an automobile.

In recent years the popularity of lightweight motor-driven two-wheeled vehicles, such as motorbikes and the like, has increased tremendously. The maximum use of such vehicles, is found in the most part, away from congested city areas, and the difficulties normally encountered in transporting a motorbike or the like, from the city into such areas will readily be apparent. The only conventional automotive vehicle adapted for passenger use, yet which can carry such a vehicle is a station wagon, but even loading and unloading a motorbike from such a vehicle requires considerable physical strength, and is a rather onerous job.

A primary purpose in devising the present invention is to provide a carrier for motorbikes and other relatively lightweight two-wheeled vehicles that may be easily and removably affixed to the bumper on either the forward or rear end of an automobile, and safely and conveniently carry a motorbike to any desired destination.

Another object of the invention is to supply a carrier for a motorbike or other two-wheeled vehicle that is of relatively simple mechanical structure, requires no alteration to the automobile chassis, may be mounted on or removed from the bumper of an automobile within a matter of minutes with the expenditure of a minimum of time and effort.

A still further object of the invention is to provide a carrier for a motorbike or other two-wheeled vehicle, that will support the same in a spaced relationship from the body of the automobile on which the carrier is mounted and thus minimize the possibility of damage to the automotive body due to inadvertent contact with the two-wheeled vehicle during the time it is being transported from one location to another.

These and other objects and advantages of the invention will become apparent from the following description of first and second forms thereof, and from the accompanying drawings illustrating the same, in which:

FIGURE 1 is a perspective view of a first form of the carrier removably mounted on the bumper of an automobile and supporting a two-wheeled vehicle such as a motorbike thereon;

FIGURE 2 is a front elevational view of one of two identical parts, which in combination, comprise the first form of the invention;

FIGURE 3 is a side elevational view of one of the parts of the first form of the invention mounted on a bumper of an automoible;

FIGURE 4 is a rear elevational view of the two parts comprising the first form of the invention mounted on the bumper of an automobile;

Figure 5:
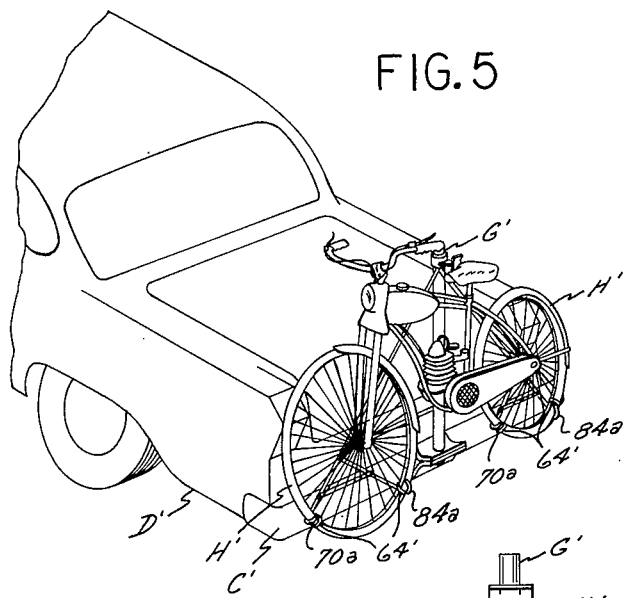
FIGURE 5 is a perspective view of a second form of the carrier removably mounted on the bumper of an automobile and supporting a two-wheeled vehicle such as a motorbike thereon.

With continuing reference to the drawings for the general arrangement of the first form of the invention, it will be seen in FIGURE 1 to include two identical parts A and B that are removably mountable on the bumper C of an automobile D to support a two-wheeled vehicle E, such as a motorbike or the like, therefrom. Inasmuch as the parts A and B are identical, only one will be described herein.

The detailed structure of the part A is shown in FIGURES 2 and 3. A clamp F is provided, which may be a conventional trailer hitch of a type commercially available, and from which the ball that normally forms a part of such a hitch, has been removed. The clamp F includes two jaws 10 and 12 that removably engage the upper and lower edges of the bumper C, and two lugs 14 and 16 project outwardly from these jaws. Vertically aligned bores (not shown) are formed in lugs 14 and 16, through which bolts 18 extend to be engaged by nuts 20.

When the nuts 20 are tightened on bolts 18 they draw the lugs 14 and 16 together and force the jaws 10 and 12 into gripping engagement with the upper and lower edges of the bumper C, whereby the lugs are held in a fixed outwardly extending position relative to the bumper. Two vertically aligned bores 14a and 16a are formed in lugs 14 and 16 respectively, the purpose of which will later become apparent.

An elongated rigid member G is provided that is preferably of circular transverse cross section. The member G includes a lower threaded portion 22 that extends downwardly through the aligned openings 14a and 16a, as can best be seen in FIGURE 2. The threaded portion 22 defines a flat, outwardly projecting body shoulder 24 at the junction thereof with the upper portion 26 of member G.

Two elongate legs 28 are provided, the upper portions 30 of which are flattened, as can best be seen in FIGURE 3, and the lower portions 32 of which extend outwardly and upwardly. Horizontally aligned bores (not shown) are formed in the upper portion 30 through which a bolt 34 extends to engage a bore 36 formed in the upper portion 26 of member G. The bore 36 is parallel to the longitudinal edges of the lugs 14 and 16. The bolt 34 is engaged by a nut 38 to hold it in position on the member G, and this bolt serves to pivotally and adjustably support the legs 28.

It will be noted in FIGURE 3 that the legs 28 angle outwardly from the member G as they approach the lower portion thereof. A rigid spacer 40 extends outwardly from the lower portion 26 of member G (FIGURE 3), and supports a crossbar 42 on the outer end thereof, and a number of longitudinally spaced openings 44 are formed in the end portions of this crossbar. Each of the legs 28 has a bore 46 formed therein, as best shown in FIGURE 3, that can be brought into horizontal alignment with one of the bores 44.

Two bolts 48 are provided which extend through the bores 46 and a desired one of the openings 44, to adjustably support the legs 28 in desired angular relationship relative to the member G, as shown in FIGURE 2. It will be apparent that in order for the bore 46 to be brought into longitudinal alignment with each of the openings 44, the openings must not only be longitudinally spaced on the crossbar 42, but must be radially spaced from the bolt 34 in such a manner that as each leg 28 is pivoted on the bolt, the bore will be in longitudinal alignment with one of the openings. This differential in radial spacing of the openings 44 can be easily eliminated by making the bore 46 a vertically extending slot, rather than a bore of circular cross section. When the lower portions 32 of each pair of legs 28 are adjusted as shown in FIGURE 2, they cooperatively support one of the wheels H of the two-wheeled vehicle E. A positioner J for the two-wheeled vehicle E when supported on the first form of the invention, is adjustably mounted on the upper portion 26 of the member G above the bolt 34.

The positioner J includes a cylindrical sleeve 50 in which a tapped bore (not shown) is formed that is threadedly engaged by a thumb screw 52. By tightening the screw 52, the inner end thereof (not shown) may be brought into pressure contact with the external surface of the member G whereby the sleeve 50 is held at a desired elevation thereon.

A bar 54 projects outwardly from the sleeve 50, and a plate 56 is vertically mounted on the outer end thereof. The upper portion of plate 56 preferably turns outwardly at an angle, as shown in FIGURE 3. Plate 56 may be brought into engagement with a convenient portion of the two-wheeled vehicle E when it is mounted on the first form of the invention in the manner shown in FIGURE 1. When plate 56 is in contact with the two-wheeled vehicle E as described, it holds the two-wheeled vehicle outwardly from the body of the automobile D, and hence inadvertent scratching or defacing of the automobile by contact with the two-wheeled vehicle is minimized.

The sleeve 50 (FIGURE 3) has an eye 58 mounted thereon, through which a strap 60 can be extended to engage one of the wheels H, or other desired portion of the two-wheeled vehicle E, to removably maintain it in a fixed position relative to the upright member G. An eye 62 is also affixed to each of the lower curved leg portions 32 through which a strap 64 is extended to encircle a portion of one of the wheels H and removably maintain the wheel in a fixed position relative to the first form of the invention.

The first form of the invention is simple and easy to use. The clamps F are removably affixed to the bumper C in such transversely disposed relationship that the adjoining pairs of curved lower leg portions 32 will support the wheels H of the two-wheeled vehicle E in the manner shown in FIGURE 1. After the two-wheeled vehicle E is placed in this supported position, the positioners J are adjusted on the members G to bring the plates 56 thereof into abutting contact with adjacent portions of the two-wheeled vehicle. The straps 60 are then passed through the bike wheels and secured in the engaging positions shown in FIGURE 1. The straps 64 that extend through the eye 62 (FIGURE 1) are likewise passed through the wheels H to removably secure them in place on the lower leg portions 32. The two-wheeled vehicle E is then removably but securely affixed in a carrying position to the automobile D and can be transported to any desired destination where it is disengaged from the first form of the invention by reversing the sequence of steps just described.

The members G, as illustrated in FIGURE 3, are removably mounted on the clamps F by extending the lower portions 22 thereof through the aligned bores 14a and 16a formed in the clamps, with the downwardly projecting portions of the members being engaged by nuts 66. As the nuts 66 are tightened on the portions 22, the body shoulder 24 is moved into pressure contact with the upper surface of the lugs 14 whereby the members G are held in the upright positions on the lugs shown in FIGURES 1-4 inclusive.

Figure 6:
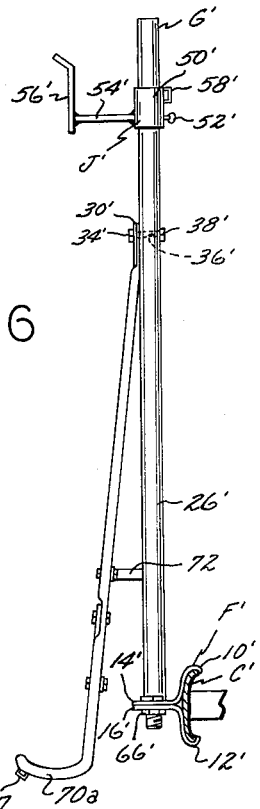
FIGURE 6 is a side elevational view of the second form of the invention mounted on the bumper of an automobile.
Figure 7:
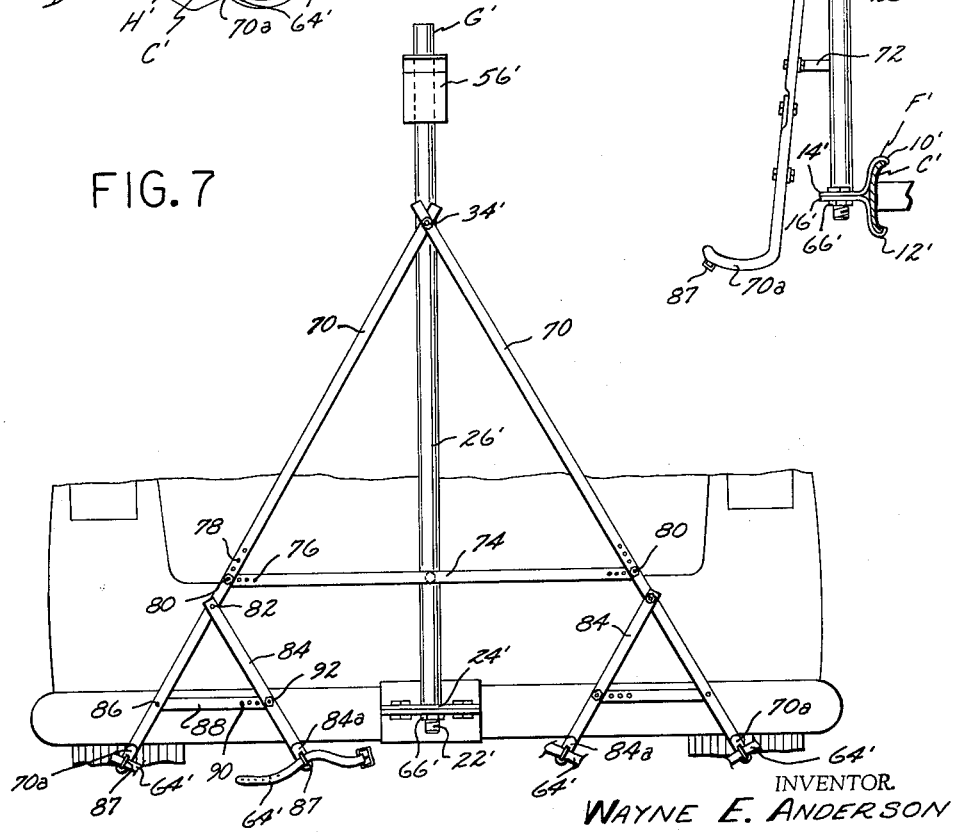
FIGURE 7 is a rear elevational view of the second form of the invention removably mounted on the bumper of an automobile.

The second form of the invention is shown in FIGURES 5-7 inclusive, which includes one clamp F' and a member G' that are identical to the clamp F and member G previously described in conjunction with the first form of the invention, other than that they are of heavier construction, for the clamp F' and member G' support the total weight of the two-wheeled vehicle E. Accordingly, the clamp F' and member G' need not be again described in detail. The same numerals used in denoting various elements comprising the clamp F and member G are likewise used to identify the same elements comprising the second form thereof, but to which a prime has been added.

A bolt 34' extends through the upper portion of member G' and pivotally and adjustably supports two legs 70. The upper end portions of legs 70 are flattened, and aligned bores are formed therein through which the bolt 34' extends. As best shown in FIGURE 6, the legs 70 angle outwardly from the flattened upper end portions thereof. A spacer 72 projects outwardly from the upper portion 26' of the member G', and supports a horizontally disposed crossbar 74 on the outer end thereof. A number of spaced bores 76 are formed in the outer end of the crossbar 74, each one of which may be brought into alignment with one of a number of bores 78 formed in the legs 70.

When the bores 76 and 78 are in alignment, bolts 80 can be extended therethrough to maintain the legs 70 in a desired angular relationship relative to the member G', as illustrated in FIGURE 7. A pin or bolt 82 projects outwardly from each leg 70 and serves to pivotally support an arm 84 thereon. Outwardly and upwardly extending curved portions 70a and 84a are formed on the lower ends of the legs 70 and arms 84, respectively, each pair of which cooperatively serve to support one of the wheels H of a two-wheeled vehicle in the manner shown in FIGURE 5. Another pin or bolt 86 extends outwardly from each of the legs 70 below the pin 82 to pivotally support a cross piece 88, in the inwardly disposed end of which a number of spaced openings 90 are formed.

Each of the openings 90 may be place in alignment with a pin or bolt 92 that extends through an opening (not shown) in one of the arms 84, and when so engaging one of these openings, the pin 92 serves to hold the arm 84 in a desired angular relationship relative to one of the legs 70, as best seen in FIGURE 7. An eye 87 is supported from each of the end portions 70a and 84a through which a strap 64' can be extended to serve the same purpose as the strap 64 previously described.

The second form of the invention is mounted on a bumper C' of an automobile D' in the same manner as the first form of the invention. The legs 70 and arms 84 are thereafter adjusted to a position wherein the wheels H of the two-wheeled vehicle E are supported in the lower curved end portions 70a and 84a in the manner shown in FIGURE 5. The positioner J' is then placed in an elevated position on the member G' where it contacts a portion of the two-wheeled vehicle E to hold it outwardly from the automobile D' to prevent defacing thereof during the time the vehicle E is being transported.

A strap 60' is extended through the eye 58' of positioner J' and connected to a convenient portion of the two-wheeled vehicle E being carried. After the two-wheeled vehicle E has been transported to a desired location on the automobile D' (FIGURE 5), the steps previously described in mounting the vehicle E on the second form of the invention are reversed and the vehicle E is then ready for use.

It will be apparent that when the vehicle D' is not required for transporting the two-wheeled vehicle E, either the first or second form of the invention can easily be removed from the bumper C or C' by removing the bolts 18 therfrom to permit disengagement of the jaws 10 and 12 from the bumper. The first or second form of the invention can then be stored until it is again needed, whereupon it may be mounted on the bumper C or C' in the manner described herein.

Although the present invention is fully capable of achieving the objects and providing the advantages hereinbefore mentioned, it is to be understood that it is merely illustrative of the presently preferred embodiments thereof and I do not mean to be limited to the details of construction herein shown and described, other than as defined in the appended claims.

I claim:
1. A device for removably carrying a two-wheeled vehicle on either end of an automobile having a bumper, including:
   (a) an elongate rigid member;
   (b) clamp means for removably supporting said member in an upright position from said bumper;
   (c) two legs pivotally supported from the upper portion of said upright, which legs have outwardly and upwardly curved lower first portions;
   (d) two arms pivotally supported from the lower portions of said legs, which arms have upwardly and outwardly curved lower second portions;
   (e) first adjustable means for holding said legs at an angle relative to said upright;
   (f) second adjustable means for holding each of said arms at an angle relative to said leg on which it is mounted, with said arms and legs being adjustable to positions where each set of first and second portions cooperatively provide a support for one of the wheels of said two-wheeled vehicle;
   (g) means adjustably mounted on said upright for engaging a portion of said two-wheeled vehicle when said vehicle is supported on said first and second portions to hold said vehicle outwardly from said automobile; and
   (h) means for removably maintaining said two-wheeled vehicle in a fixed position relative to said upright, legs and arms when the wheels of said vehicle are supported on said first and second portions.

2. A device as defined in claim 1 wherein said upright includes a lower threaded end portion that defines a body shoulder with that part of said member thereabove, and said clamp means comprise:
   (a) two jaws that engage upper and lower edge portions of said bumper, which jaws include lugs that project outwardly therefrom in which a plurality of vertically aligned bores are formed;
   (b) a plurality of bolts and nuts, which bolts extend through said pairs of bores, with said bolts when said nuts are tightened thereon drawing said lugs together to cause said jaws to grip said bumper and be supported thereon; and
   (c) at least one nut that engages said threaded portion when said threaded portion is extended downwardly through a pair of vertically aligned openings formed in said lugs to dispose said body shoulder in abutting contact with the uppermost one of said lugs and hold said member in an upright position relative to said lugs.

3. A device as defined in claim 1 wherein said upright has a lower threaded end portion that defines a body shoulder with that part of said member thereabove, and said clamp means comprise:
   (a) two jaws that engage upper and lower edge portions of said bumper, which jaws include lugs which project outwardly therefrom and in which vertically aligned bores are formed;
   (b) a plurality of bolts and nuts, which bolts extend through said aligned bores in said lugs, and when said nuts are tightened thereon said bolts draw said lugs together to cause said jaws to grip said bumper to support said bumper thereon; and
   (c) at least one nut that engages said threaded portion when said threaded portion is extended downwardly through said first and second vertically aligned openings formed in said lugs to dispose said body shoulder in abutting contact with the upper surface of the uppermost one of said lugs, and with said nut when tightened cooperating with said body shoulder to grip said lugs therebetween and hold said member in an upright position relative to said lugs.

4. A device as defined in claim 1 wherein said first adjustable means includes:
   (a) a cross bar, in each end portion of which a plurality of longitudinally spaced openings are formed, each of which openings is adapted to be aligned with an opening formed in one of said legs;
   (b) two threaded members that extend through said openings formed in said cross bar and two of said openings formed in said legs to adjustably hold said legs at desired angles relative to said upright; and
   (c) two nuts that engage said threaded members to hold them in engagement in said openings in said cross bar and said legs.

5. A device as defined in claim 1 wherein said second means include:
   (a) two cross pieces that are pivotally supported from lower portions of said legs, with each of said cross pieces having a plurality of longitudinally spaced openings formed in the free end portion thereof, and with each of said openings being alignable with an opening formed in one of said arms;
   (b) two threaded members that extend through said openings formed in said arms to adjustably hold said arms at desired angles relative to said legs; and
   (c) two nuts that engage said threaded members to hold them in engagement in said openings in said cross pieces and said arms.

6. A device as defined in claim 1 wherein said means adjustably supported on said upright includes:
   (a) a sleeve slidably mounted on said member, which sleeve has a transverse tapped bore formed therein;
   (b) a screw threadedly engaging said tapped bore, which screw when tightened holds said sleeve at a desired elevation on said member;
   (c) a hold-out plate that can engage a portion of said two-wheeled vehicle; and
   (d) a bar that supports said plate outwardly from said sleeve.

7. A device for removably carrying a two-wheeled vehicle on either end of an automobile equipped with a bumper, including:
   (a) two elongate rigid members;
   (b) clamp means for removably supporting said members in transversely spaced upright positions from said bumper;
   (c) two pairs of legs, each pair of which is pivotally supported from an upper portion of one of said uprights, with said legs having outwardly and upwardly curving lower end portions;
   (d) adjustable means for holding each of said pair of legs at a desired angle relative to said member on which said pair of legs is supported, with said lower end portions of each of said pair of legs when so angularly disposed providing a support for one of the wheels of said two-wheeled vehicle;
   (e) means adjustably supported on said upright for engaging a portion of said two-wheeled vehicle when said vehicle is supported on said curved lower end portions to maintain said vehicle outwardly from said automobile; and
   (f) means for removably holding said two-wheeled vehicle in a fixed position relative to said uprights and legs when the wheels of said two-wheeled vehicle are supported on said curved lower end portions.

8. A device as defined in claim 6 wherein each of said uprights has a lower threaded end portion which defines a body shoulder with that part of said member thereabove and in which said clamp means comprise:
   (a) two pairs of upper and lower jaws that engage upper and lower edges of said bumper, each of which pairs of jaws include lugs that project outwardly therefrom in which a plurality of pairs of aligned bores are formed;
   (b) a plurality of bolts and nuts, which bolts extend through said pairs of bores, and which bolts when said nuts are tightened thereon draw said lugs together to cause said jaws to grip said bumper and be supported thereon; and (c) at least two second nuts that engage said threaded portions when said threaded portions are extended downwardly through a pair of vertically aligned openings formed in each of said pair of lugs to dispose one of said body shoulders in abutting contact with the upper surface of the uppermost one of said lugs in each pair thereof, and which nuts when tightened cooperate with said body shoulders to grip said lugs therebetween and hold said members in an upright position relative to said lugs.

9. A device as defined in claim 6 wherein said adjustable means comprise:

(a) two cross bars, in each of which a plurality of longitudinally spaced openings are formed in the end portions thereof, with each of said openings being alignable with an opening formed in one of said legs; and (b) a plurality of nuts and bolts, with each of said bolts extending through one of said openings in said legs and one of said openings in said cross bars to hold said legs at a desired angular position relative to said uprights, and with said nuts when engaging said bolts preventing inadvertent dislodgement of said bolts from said openings.

10. A device as defined in claim 6 wherein said means adjustably supported on said upright includes:

(a) a sleeve slidably mounted on said member, which sleeve has a transverse tapped bore formed therein;

(b) a screw threadedly engaging said tapped bore, which screw when tightened holds said sleeve at a desired elevation on said member;

(c) a hold-out plate that can engage a portion of said two-wheeled vehicle; and (d) a bar that supports said plate outwardly from said sleeve.

| | | |
|---|---|---|
| 1,312,829 | 8/1919 | Brokenshire _____ 224—42.26 |
| 2,552,977 | 5/1951 | Klotz. |

FOREIGN PATENTS 61,636   10/1939   Norway.

GERALD M. FORLENZA, *Primary Examiner.*